United States Patent
Ostyakov et al.

(10) Patent No.: US 12,493,963 B2
(45) Date of Patent: Dec. 9, 2025

(54) JOINT UNSUPERVISED OBJECT SEGMENTATION AND INPAINTING

(71) Applicant: Samsung Electronics Co., Ltd., Suwon-si (KR)

(72) Inventors: Pavel Aleksandrovich Ostyakov, Moscow (RU); Roman Evgenievich Suvorov, Moscow (RU); Elizaveta Mikhailovna Logacheva, Moscow (RU); Oleg Igorevich Khomenko, Moscow (RU); Sergey Igorevich Nikolenko, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1303 days.

(21) Appl. No.: 17/277,118

(22) PCT Filed: Nov. 5, 2019

(86) PCT No.: PCT/KR2019/014916
§ 371 (c)(1),
(2) Date: Mar. 17, 2021

(87) PCT Pub. No.: WO2020/101246
PCT Pub. Date: May 22, 2020

(65) Prior Publication Data
US 2021/0383242 A1    Dec. 9, 2021

(30) Foreign Application Priority Data

Nov. 13, 2018 (RU) .............................. 2018139928
Feb. 20, 2019 (RU) .............................. 2019104710

(51) Int. Cl.
*G06T 7/11*      (2017.01)
*G06F 18/21*      (2023.01)
(Continued)

(52) U.S. Cl.
CPC ............. *G06T 7/11* (2017.01); *G06F 18/2185* (2023.01); *G06F 18/2193* (2023.01);
(Continued)

(58) Field of Classification Search
CPC ..... G06T 7/11; G06T 5/50; G06T 5/77; G06T 7/194; G06T 2207/20081;
(Continued)

(56) References Cited

U.S. PATENT DOCUMENTS 7,720,283 B2    5/2010    Sun et al.
9,396,523 B2    7/2016    Jancsary et al.
(Continued)

FOREIGN PATENT DOCUMENTS

CN      103984944 B    8/2017
CN      108182657 A    6/2018
(Continued)

OTHER PUBLICATIONS

Dwibedi et al., Cut, Paste and Learn: Surprisingly Easy Synthesis for Instance Detection, Aug. 4, 2017, 11 pages (Year: 2017).*
(Continued)

*Primary Examiner* — Omar F Fernandez Rivas
*Assistant Examiner* — Tri T Nguyen
(74) *Attorney, Agent, or Firm* — Jefferson IP Law, LLP

(57) ABSTRACT

The invention relates to implementation of image processing functions associated with finding the boundaries of objects, removing objects from an image, inserting objects into an image, creating new images from a combination of existing images. Proposed is a method for automated image processing and a computing system for performing automated image processing, comprising: first neural network for forming a coarse image z by segmenting an object O from an original image x containing the object O and background $B_x$ by a segmentation mask, and, using the mask, cutting off the
(Continued)

segmented object O from the image x and pasting it onto an image y containing only background $B_y$, second neural network for constructing an enhanced version of an image ŷ with pasted segmented object O by enhancing coarse image z based on the original images x̂ and y and the mask m; third neural network, for restoring the background-only image x̂ without removed segmented object O by inpainting image obtained by zeroing out pixels of image x using the mask m; wherein the first, second and third neural networks are combined into common architecture of neural network for sequential performing segmentation, enhancing and inpainting and for simultaneously learning, wherein the common architecture of neural network accepts the images and outputs processed images of the same dimensions.

13 Claims, 3 Drawing Sheets

(51) Int. Cl.
```
     G06N 3/045         (2023.01)
     G06N 3/088         (2023.01)
     G06T 5/50          (2006.01)
     G06T 5/77          (2024.01)
     G06T 7/194         (2017.01)
```
(52) U.S. Cl.
CPC ............. *G06N 3/045* (2023.01); *G06N 3/088* (2013.01); *G06T 5/50* (2013.01); *G06T 5/77* (2024.01); *G06T 7/194* (2017.01); *G06T 2207/20081* (2013.01); *G06T 2207/20084* (2013.01)

(58) Field of Classification Search
CPC . G06T 2207/20084; G06T 5/60; G06T 11/60; G06F 18/2185; G06F 18/2193; G06N 3/045; G06N 3/088; G06N 3/047; G06N 3/084
See application file for complete search history.

(56) References Cited

U.S. PATENT DOCUMENTS

| | | | |
|---|---|---|---|
| 9,438,769 B1* | 9/2016 | Fan | H04N 1/4072 |
| 9,760,978 B1 | 9/2017 | Lu et al. | |
| 9,811,883 B2 | 11/2017 | Cho et al. | |
| 10,262,236 B2* | 4/2019 | Lim | G06F 18/28 |
| 10,614,557 B2* | 4/2020 | Lin | G06T 5/77 |
| 2007/0025637 A1* | 2/2007 | Setlur | G06T 3/04 |
| | | | 382/173 |
| 2015/0030237 A1 | 1/2015 | Jancsary et al. | |
| 2015/0086112 A1* | 3/2015 | Tian | G06V 10/26 |
| | | | 382/173 |
| 2017/0287137 A1 | 10/2017 | Lin et al. | |
| 2018/0108119 A1 | 4/2018 | Kokemohr | |
| 2018/0122033 A1 | 5/2018 | Mayuzumi | |
| 2018/0232887 A1 | 8/2018 | Lin et al. | |
| 2018/0295339 A1 | 10/2018 | Chen et al. | |

FOREIGN PATENT DOCUMENTS

| | | |
|---|---|---|
| KR | 10-1349699 B1 | 1/2014 |
| KR | 10-2016-0062571 A | 6/2016 |
| RU | 2580473 C1 | 4/2016 |
| RU | 2583725 C1 | 5/2016 |

OTHER PUBLICATIONS

Remez et al., Learning to Segment via Cut-and-Paste, Mar. 16, 2018, 17 pages (Year: 2018).*

Liu et al., Generative Image Inpainting With Neural Features, Aug. 17, 2018, 5 pages (Year: 2018).*

Notification of Due Registration Formalities, dated Jun. 21, 2024, issued in Chinese Application No. 201980074975.X.

Xu Zhao et al., Joint Background Reconstruction and Foreground Segmentation via a Two-Stage Convolutional Neural Network, Jul. 24, 2017.

Decision to Grant a Patent dated Oct. 22, 2019, issued in the Russian Patent Office Application No. 2019104710.

Search Report dated Oct. 21, 2019, issued in the Russian Patent Office Application No. 2019104710.

International Search Report dated Feb. 21, 2020, issued in International Application No. PCT/KR2019/014916.

J A. Almahairi, S. Rajeswar, A. Sordoni, R Bachman, and A. Courville, "Augmented CycleGAN: Learning Many-to-Many Mappings from Unpaired Data", arXiv preprint arXiv.1802.10151, Jun. 18, 2018.

K. Bousmalis, A. lipan, P. Wohlhart, Y. Bai, M. Kelcey, M. Kalakrishnan, L Downs, J. Ibarz, P. Pastor, K. Konolige et al., "Using Simulation and Domain Adaptation to Improve Efficiency of Deep Robotic Grasping", In 2018 IEEE International Conference on Robotics and Automation (ICRA), pp. 4243-4250. IEEE, 2018, arXiv:1709.07857, Sep. 25, 2017.

Y. Choi, M. Choi, M. Kim, J.-W. Ha, S. Kim, and J. Choo, "StarGAN: Unified Generative Adversarial Networks for Multi-Domain Image-to-Image Translation", arXiv preprint. 1711, Nov. 24, 2017.

C. Chu, A. Zhmoginov, and M. Sandler, "CycleGAN: A Master of Steganography", arXiv preprint arXiv: 1712.02950, Dec. 16, 2017.

M. Cordts, M. Omran, S. Ramos, T. Rehfeld, M. Enzweiler, R. Benenson, U. Franke, S. Roth, and B. Schiele, "The Cityscapes Dataset for Semantic Urban Scene Understanding", In Proc. of the IEEE Conference on Computer Vision and Pattern Recognition (CVPR), arXiv:1604.01685, Apr. 7, 2016.

I. Goodfellow, J. Pouget-Abadie, M. Mirza, B. Xu, D. Warde-Farley, S. Ozair, A. Courville, and Y. Bengio, "Generative Adversarial Nets", In Advances in neural information processing systems, pp. 2672-2680, 2014.

V. Gupta and S. Raman, "Automatic Trimap Generation for Image Matting", In Signal and Information Processing (ICon-SIP), International Conference on. pp. 1-5. IEEE. 2016, arXiv:1707.00333, Jul. 4, 2017.

H. Huang, X. Fang, Y. Ye, S. Zhang, and P. L Rosin, "Practical Automatic Background Substitution for Live Video", Computational Visual Media, 3(3):273-284, Sep. 2017.

X. Ji, J. F. Henriques, and A. Vedaldi, "Invariant Information Distillation for Unsupervised Image Segmentation and Clustering", arXiv preprint arXiv:1807.06653, Jul. 17, 2018.

J. Johnson, A. Alahi, and F. Li, "Perceptual Losses for Real-Time Style Transfer and Super-Resolution", CORR, abs/1603.08155, Mar. 27, 2016.

S. Kazemzadeh, V. Ordonez, M. Matten, and T. Berg. "ReferltGame: Referring to Objects in Photographs of Natural Scenes", In Proceedings of the 2014 conference on empirical methods in natural language processing (EMNLP), pp. 787-798, Oct. 25-29, 2014.

A. Khoreva, R. Benenson, J. H. Hosang, M. Hein, and B. Schiele, "Simple Does It: Weakly Supervised linstance and Semantic Segmentation", In CVPR, vol. 1, p. 3, 2017.

R. Krishna, Y. Zhu, O. Groth, J. Johnson, K. Hata, J. Kravitz, S. Chen, Y. Kalantidis, L.-J. Li, D. A. Shamma, M. Bernstein, and L Fei-Fei, "Visual Genome: Connecting Language and Vision Using Crowdsourced Dense Image Annotations", arXiv:1602.07332, Feb. 23, 2016.

T.-Y. Lin, M. Maire, S. Belongie, J. Hays, P. Perona, D. Ramanan, P. Dollar, and C. L. Zitnick, "Microsoft COCO: Common Objects in Context", In European conference on computer vision, pp. 740-755, Springer, arXiv:1405.0312, Jul. 5, 2014.

M.-Y. Liu, T. Breuel, and J. Kautz, "Unsupervised Image-to-Image Translation Networks", In Advances in Neural Information Processing Systems, pp. 700-708, arXiv:1703.00848, Oct. 6, 2017.

X. Mao, Q. Li, H. Xie, R. Lau, Z. Wang, and S. P. Smolley, "Least Squares Generative Adversarial Networks", arXiv preprint ArXiv:1611.04076, 2(5), 2016, Apr. 5, 2017.

(56) References Cited

OTHER PUBLICATIONS

B. A. Plummer, L. Wang, C. M. Cervantes, J. C Caicedo, J. Hockenmaier, and S. Lazebnik, "Flickr30k Entities: Collecting Region-to-Phrase Correspondences for Richer Image-to-Sentence Models", In Proceedings of the IEEE International conference on computer vision, pp. 2641-2649, 2015.
T. Remez, J. Huang, and M. Brown, "Learning to Segment via Cut-and-Paste", arXiv preprint arXiv:1803.06414, 2018.
S. Ren, K. He, R. Girshick, and J. Sun, "Faster R-CNN: Towards Real-Time Object Detection with Region Proposal Networks", In Advances in neural information processing systems, pp. 91-99, arXiv:1506.01497, Jun. 4, 2015.
O. Ronneberger, P Fischer, and T. Brox, "U-Net: Convolutional Networks for Biomedical Image Segmentation", CoRR, abs/1505.04597, May 18, 2015.
C. Rother, V. Kolmogorov, and A. Blake, "GrabCut—Interactive Foreground Extraction using Iterated Graph Cuts", In ACM transactions on graphics (TOG), vol. 23, pp. 309-314. ACM, 2004.
T.-C. Wang, M.-Y. Liu, J.-Y. Zhu, A. Tao, J. Kautz, and B. Catanzaro, "High-Resolution Image Synthesis and Semantic Manipulation with Conditional GANs", arXiv preprint arXiv:1711.11585, Nov. 30, 2017.
Z. Wu, R. Chang, J. Ma, C. Lu, and C.-K. Tang, "Annotation-Free and One-Shot Learning for Instance Segmentation of Homogeneous Object Clusters", arXiv preprint arXiv:1802.00383, Feb. 1, 2018.
X. Xia and B. Kulis, "W-Net: A Deep Model for Fully Unsupervised Image Segmentation", arXiv preprint arXiv:1711.08506, Nov. 22, 2017.
W. Xian, P. Sangkloy, J. Lu, C Fang, F. Yu, and J. Hays, "TextureGAN: Controlling Deep Image Synthesis with Texture Patches", CoRR, abs/1706.02823, Jun. 9, 2017.
N. Xu, B. L. Price, S. Cohen, and T. S. Huang, "Deep Image Matting", In CVPR, vol. 2, p. 4, arXiv:1703.03872, Apr. 11, 2017.
Z. Yan, X. Li, M. Li, W. Zuo, and S. Shan, "Shift-Net: Image Inpainting via Deep Feature Rearrangement", arXiv preprint arXiv:1801.09392, Apr. 13, 2018.
L. Yu, Z. Lin, X. Shen, J. Yang, X. Lu, M. Bansal, and T. L. Berg, "MAttNet: Modular Attention Network for Referring Expression Comprehension", In Proceedings of the IEEE Conference on Computer Vision and Pattern Recognition (CVPR), arXiv:1801.08186, Mar. 27, 2018.
Y. Zhang, L. Yuan, Y. Guo, Z. He, I.-A. Huang, and H. Lee, "Discriminative Bimodal Networks for Visual Localization and Detection with Natural Language Queries", In Proceedings of the IEEE Conference on Computer Vision and Pattern Recognition (CVPR), arXiv:1704.03944, Apr. 17, 2017.
J. Zhu, T. Park, P. Isola, and A. A. Efros, "Unpaired Image-to-Image Translation using Cycle-Consistent Adversarial Networks", CoRR, abs/1703.10593, Mar. 30, 2017.
J.-Y. Zhu, R. Zhang, D. Pathak, T. Darrell, A. A. Efros, O. Wang, and E. Shechtman, "Toward Multimodal Image-to-Image Translation", In Advances in Neural Information Processing Systems, pp. 465-476, arXiv:1711.11586, Nov. 30, 2017.
Kang-Yu Ni, "Variational PDE-Based Image Segmentation and Inpainting with Applications in Computer Graphics", 2008.
European Examination Report dated Jul. 14, 2022; European Appln. No. 19 884 513.3-1210.
European Search Report dated Oct. 29, 2021; European Appln. No. 19884513.3-1210 / 3830792 PCT/KR2019014916.

\* cited by examiner

[Fig. 1]
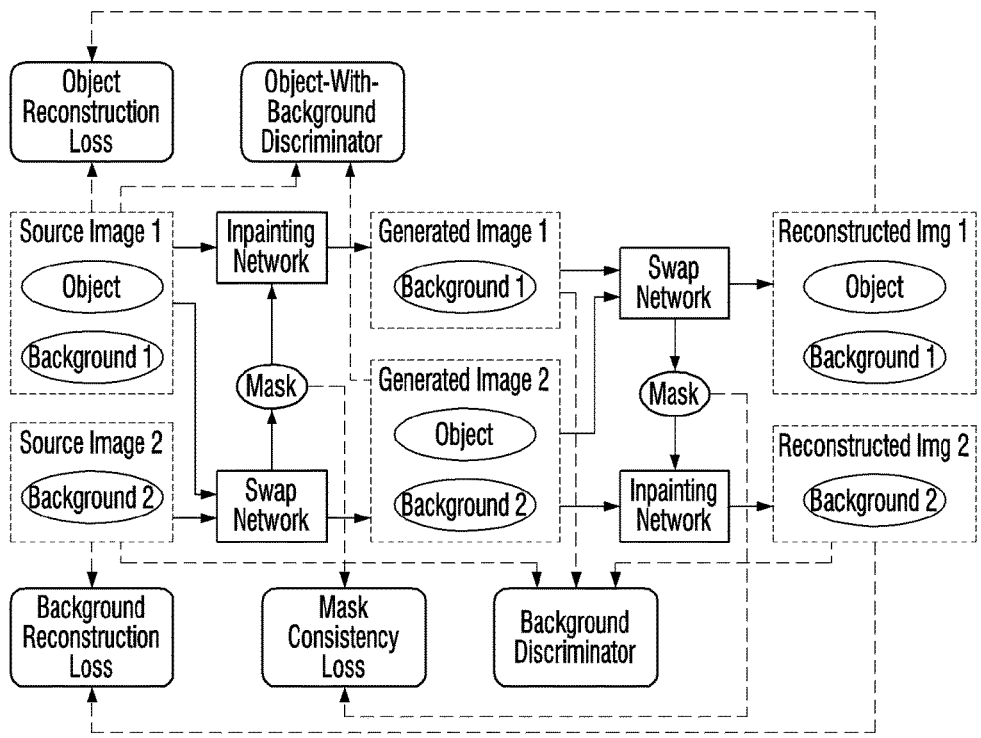
[Fig. 2]
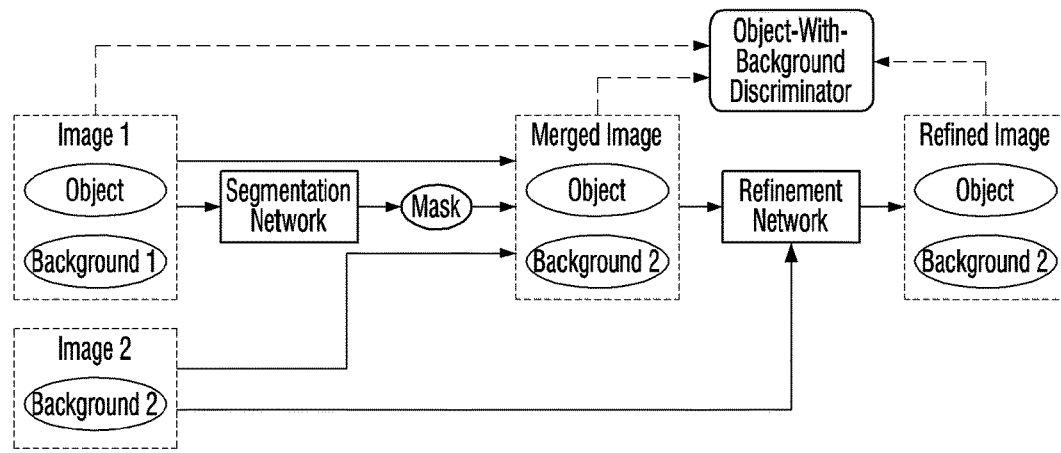
[Fig. 3]
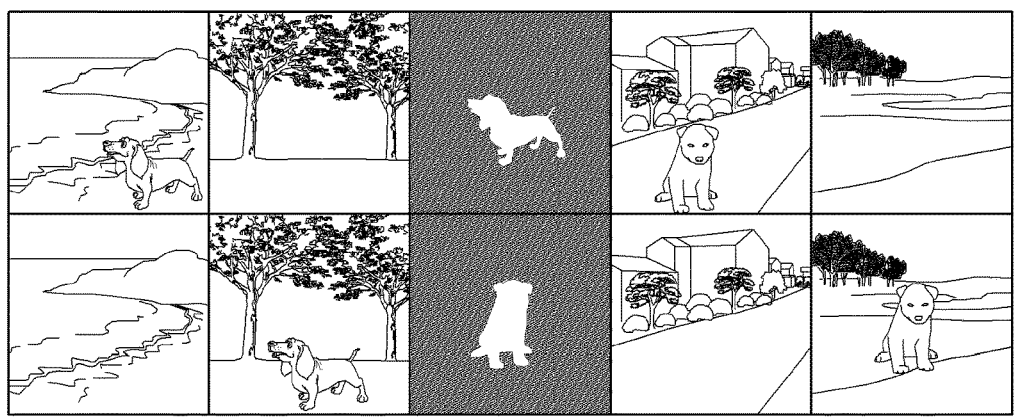

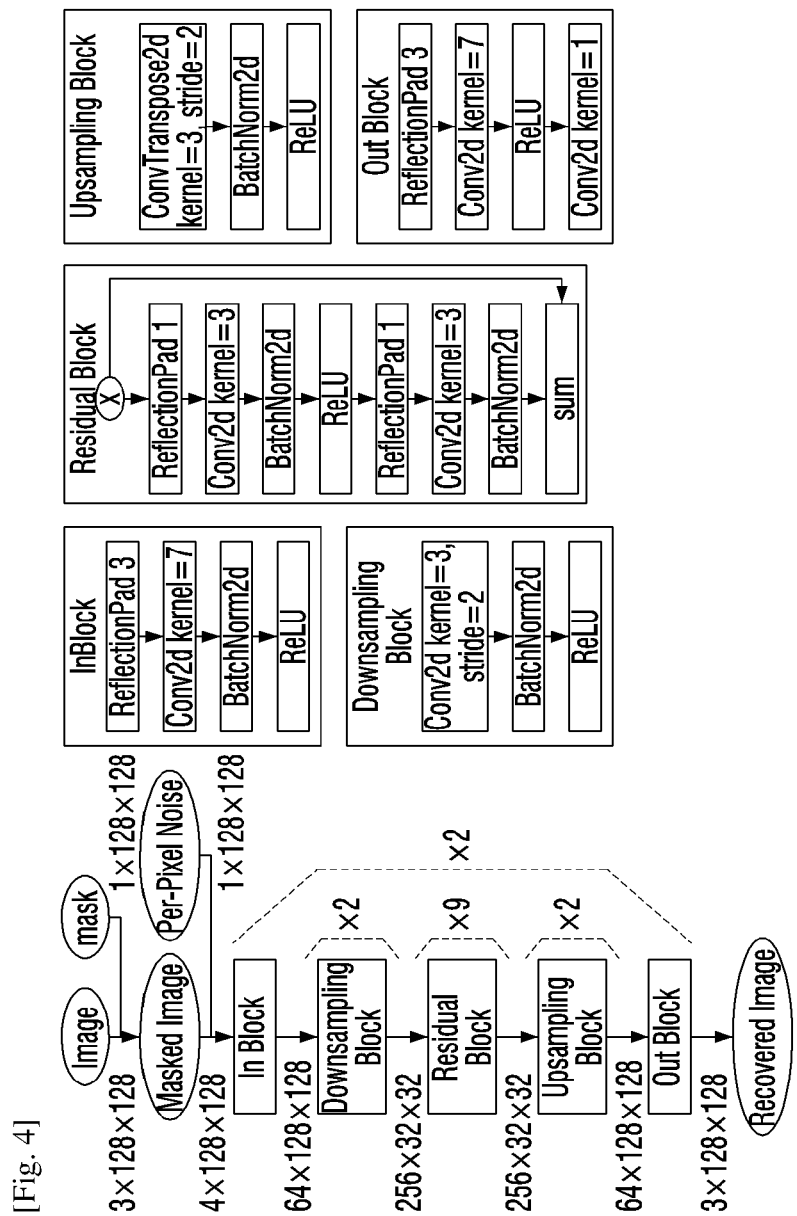
[Fig. 4]

JOINT UNSUPERVISED OBJECT SEGMENTATION AND INPAINTING

TECHNICAL FIELD

An invention relates to implementation of image processing functions associated with finding the boundaries of objects, removing objects from an image, inserting objects into an image, creating new images from a combination of existing.

BACKGROUND ART

Unsupervised and weakly supervised object segmentation. In [18] authors propose a GAN-based [30] technique to generate object segmentation masks from bounding boxes. Their training pipeline consists of taking two crops of the same image: one with object and one without any object. Objects are detected using Faster R-CNN [19]. Then they train a GAN to produce a segmentation mask so that these two crops merged with that mask result into a plausible image. Authors use a combination of adversarial loss, existence loss (which verifies that an object is present on an image) and cut loss (which verifies that no object part left after an object has been cut). They experiment with only some classes from Cityscapes [5] and all classes from MS COCO [14] datasets. Authors report that their approach achieves higher mean intersection-over-union values than classic GrabCut [21] algorithm and recent Simple-Does-It [12]. That approach requires a pretrained Faster R-CNN and a special policy for foreground and background patch selection. It also experiences difficulties with properly segmenting some object classes (e.g. kite, giraffe etc). Their approach also works well only with small resolution images (28×28).

In [23] authors propose an annotation-free framework to learn segmentation network for homogeneous objects. They use an adaptive synthetic data generation process to create a training dataset.

While being traditionally tackled with superpixel clustering, unsupervised image segmentation recently has been addressed with deep learning [9]. In the latter paper authors propose to maximize information between two clustered vectors obtained by fully convolutional network from nearby patches of the same image. A similar technique, but constrained with reconstruction loss, has been proposed in [24]. Authors describe W-Net (autoencoder with U-Netlike encoder and decoder), which tries to cluster pixels at inner layer and then reconstruct image from pixel clusters. Their segmentation result is unaware of object classes.

Visual grounding. Methods for visual grounding aim on unsupervised or weakly supervised matching of freeform text queries and regions of images. Usually super-vision takes form of pairs of (Image; Caption). Model performance is usually measured as intersection-over-union against ground truth labels. The most popular datasets are Visual Genome [13], Flickr30k [17], Refer-It-Game [11] and MS COCO [14]. General approach to grounding consists in predicting if the given caption and image corresponds to each other. Negative samples are obtained by shuffling captions and images independently. Text-image attention is the core feature of most models for visual grounding. [28]. Obviously, using more fine-grained supervision (e.g. region-level annotations instead of image-level) allows to achieve higher scores [29].

Trimap generation. Trimap generation is a problem of producing a segmentation of an image into three classes: foreground, background and unknown (transparent foreground). Most algorithms require human intervention to propose trimap, but recently superpixel and clustering based approaches have been proposed for automatic trimap generation [7]. However, their approach requires executing multiple optimization steps for each image. Deep learning is used to produce alpha matting mask given image and a trimap [26]. There is also some work on video matting and background substitution in video [8]. They use per-frame superpixel segmentation and then optimize energy in conditional random field of Gaussian mixture models to separate foreground and background frame-by-frame.

Generative adversarial networks. In the latest years, GANs [6] are probably the most frequently used approach to train a generative model. Yet powerful, they prone to unstable training process and inconsistent performance on higher resolution images. A more recently proposed approach, CycleGAN [30] trains two GANs together to establish bidirectional mapping between two domains. Their approach offers much greater stability and consistency. On contrary, it requires the dataset to visualize a kind of invertible operation. A plenty of modifications and applications to CycleGAN have been published, including semantic image manipulation [22], domain adaptation [2], unsupervised image-to-image translation [15], multi-domain translation [3] and many others. There is also a problem that such a mapping between domains may be ambiguous. BicycleGAN [31] and augmented CycleGAN [1] address that problem by requiring that mapping must preserve latent representations.

In that paper we base on ideas of Cut&Paste [18] and CycleGAN [6] and propose a novel architecture and pipeline, which addresses a different problem (background swapping) and achieve better results on unsupervised object segmentation, inpainting and image blending.

DISCLOSURE

Technical Problem

The present invention presents a novel approach to visual understanding by simultaneously learning to segment object masks and remove objects from background (aka cut and paste).

Proposed is computing system for performing automated image processing, comprising: first neural network for forming a coarse image z by segmenting an object O from an original image x containing the object O and background $B_x$ by a segmentation mask, and, using the mask, cutting off the segmented object O from the image x and pasting it onto an image y containing only background $B_y$, second neural network for constructing an enhanced version of an image ŷ with pasted segmented object O by enhancing coarse image z based on the original images x and y and the mask m; third neural network, for restoring the background-only image x̂ without removed segmented object O by inpainting image obtained by zeroing out pixels of image x using the mask m; wherein the first, second and third neural networks are combined into common architecture of neural network for sequential performing segmentation, enhancing and inpainting and for simultaneously learning, wherein the common architecture of neural network accepts the images and outputs processed images of the same dimensions. At that the first, second and third neural networks are generators which create the images x̂ and ŷ and convert them. The system further comprising two neural networks configured as discriminators, which estimate plausibility of the images. At that, the first discriminator is a background discriminator that attempts to distinguish between a reference real background image and inpainted background image; a second discriminator is an object discriminator that attempts to distinguish between a reference real object O image and enhanced object O image. At that, the first and second neural networks constitute a swap network. At that, the swap network is configured to train end-to-end with loss functions for constructing enhanced version of the image ŷ with pasted the segmented object O. At that, one of loss functions is an object reconstruction function for ensuring consistency and training stability, and is implemented as the mean absolute difference between the image x and image x̂. At that one of loss functions is an adversarial object function for increasing the plausibility of the image ŷ, and is implemented with a dedicated discriminator network. At that one of loss functions is a mask consistency function for making the first network being invariant against the background, and is implemented as the mean absolute distance between the mask extracted from image x and the mask extracted from image ŷ. One of loss functions is an object enhancement identity function for forcing the second network to produce images closer to real images, and is the mean absolute distance between Genh(x) and x self. At that, one of loss functions is a background identity function for ensuring that the common architecture does not do anything to an image that does not contain objects. At that one of loss functions is an overall loss function that is a linear combination of an object reconstruction function, an adversarial object function, a mask consistency function, an object enhancement identity function, a background identity function. At that, the segmentation mask is predicted by the first network in view of image x.

Proposed is method for automated image processing by the following steps: using first neural network for forming a coarse image z by segmenting an object O from an original image x containing the object O and background $B_x$ by a segmentation mask, and, using the mask, cutting off the segmented object O from the image x and pasting it onto an image y containing only background $B_y$, using second neural network for constructing an enhanced version of an image ŷ with pasted segmented object O by enhancing coarse image z based on the original images x and y and the mask m; using third neural network for restoring the background-only image x̂ without removed segmented object O by inpainting image obtained by zeroing out pixels of image x using the mask m; outputting the images x̂ and ŷ of the same dimensions. At that, first, second and third neural networks are generators which create the images x̂ and ŷ and convert their. The method further comprising two neural networks configured as discriminators, which estimate plausibility of the images. At that the first discriminator is a background discriminator that attempts to distinguish between a reference real background image and inpainted background image; a second discriminator is an object discriminator that attempts to distinguish between a reference real object O image and enhanced object O image. At that, first and second neural networks constitute swap network. At that, the swap network is configured to train end-to-end with loss functions for constructing enhanced version of the image ŷ with pasted the segmented object O. At that, one of loss functions is an object reconstruction function for ensuring consistency and training stability, and is implemented as the mean absolute difference between the image x and image x̂. At that, one of loss functions is an adversarial object function for increasing the plausibility of the image, and is implemented with a dedicated discriminator network. At that one of loss functions is a mask consistency function for making the first network being invariant against the background, and is implemented as the mean absolute distance between the mask extracted from image x and the mask extracted from image ŷ. At that, one of loss functions is an object enhancement identity function for enhancing the second network to produce images closer to real images, and is the mean absolute distance between Genh(x) and x self. At that, one of loss functions is a background identity function for ensuring that the common architecture does not do anything to an image that does not contain objects. At that, one of loss functions is an overall loss function that is a linear combination of an object reconstruction function, an adversarial object function, a mask consistency function, an object enhancement identity function, a background identity function. At that, the segmentation mask is predicted by the first network in view of image x.

BRIEF DESCRIPTION OF DRAWINGS

The above and/or other aspects will be more apparent by describing exemplary embodiments with reference to the accompanying drawings, in which:

FIG. 1 an architecture of the neural network, data preparation scheme and setting its parameters. A high-level overview of the SEIGAN (Segment-Enhance-Inpainting) pipeline for joint segmentation and inpainting: the swap operation is executed twice and optimized to reproduce original images. Ellipses denote objects and data; solid rectangles, neural networks; rounded rectangles, loss functions; solid lines show the data flows, and dashed lines indicate the flow of values to loss functions.

FIG. 2. Architecture of the swap network (from FIG. 1) that cuts the object from one image and pastes it onto another.

FIG. 3. Examples of images and masks generated by our model.

FIG. 4. Architecture of residual network used for inpainting and/or segmentation networks.

MODE FOR THE INVENTION

Figure 5:
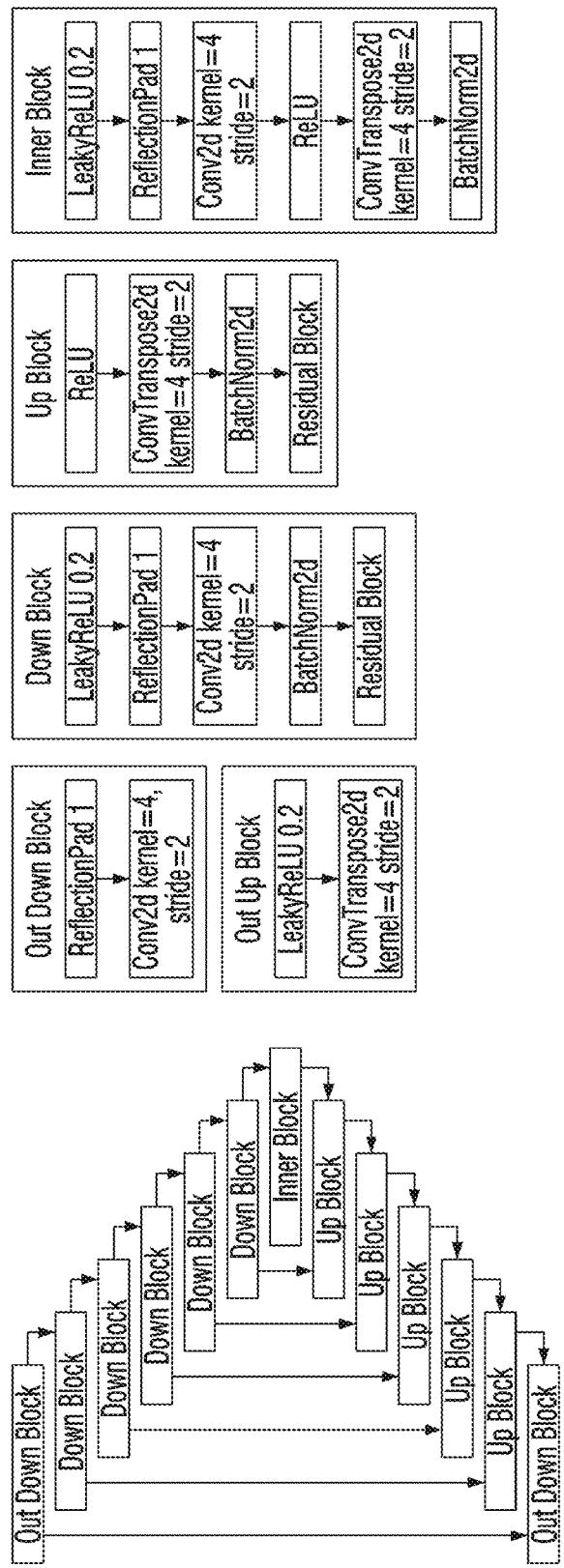
FIG. 5. Architecture of U-Network used for segmentation and refinement networks.

The proposed invention can be useful hardware comprising software products and devices that perform automatic or automated image processing, including:
graphic editor;
creative applications for creating graphic content;
hardware systems (wearable devices, smartphones, robots) for which you want to find objects in images;
augmented reality modeling (virtual/augmented reality);
to prepare data for setting up methods of machine learning (any industry).

The symbols used in the application materials are explained below.
O—an object, depicted in an image.
$B_x$—background, depicted in an image x.
$B_y$—background, depicted in an image y.
x=<O, $B_x$>—an image, containing object O and background $B_x$.
y=<∅, $B_y$>—an image, containing only background $B_y$ (and no object in foreground).
x—a set of all images x.
y—a set of all images y.
x̂=<∅, $\hat{B}_x$>—an image x with object O removed (so the image contains only background $B_x$).

$\hat{y}=<\hat{O}, \hat{B}_y>$—an image y with object O pasted.
$\hat{B}_x \approx \hat{B} \cdot \hat{B}_y \approx \hat{B}$, and $\hat{O} \approx O$—transformed (approximate) variants of backgrounds $B_x$ and $B_y$ and object O.
m=Mask(x)—segmentation mask for image x.
$z = m \odot x + (1-m) \odot y$—a coarse image constructed by blending images x and y with blending mask m.
Gseg, Ginp, Genh—neural networks used as generators for segmentation, inpainting and enhancement.
Dbg, Dobj—neural networks used as discriminators (Dbg classifies images with real backgrounds from inpainting ones, Dobj classifiers images with real objects from images with pasted ones).
Gram(i)—a Gram matrix constructed from a 3D tensor representing features of image pixels.
VGG(i)—a function to calculate a 3D tensor, which represents features of image pixels.
$L$, $L_{bg}^{disc}$, $L_{bg}^{rec}$, $L_{obj}^{rec}$, $L_{obj}^{disc}$, $L_{mask}$, $L_{obj}^{id}$, $L_{bg}^{id}$—optimization criteria used to tune parameters of neural networks.
$\lambda_1, \ldots, \lambda_7$—non-negative real coefficients used to balance importance of different optimization criteria.

The proposed image processing functions require less detailed control on the part of the person, compared to the existing analogues at the moment.

The proposed solution can be implemented in software, which in turn can be run on any devices with sufficient computing power.

Throughout the paper, we denote images as object background tuples, e.g. $x=<O, B_x>$ means that image x contains object O and background $B_x$, and $Y=<O,B_y>$ means that image y contains background $B_y$ and no objects.

The main problem that we address in this work can be formulated as follows. Given a dataset of background images $y=\{<\emptyset, B_y>\}_{y \in Y}$ and a dataset of objects on different backgrounds $X=\{<O,B_x>\}_{s \in CX}$ (unpaired, i.e., with no mapping between X and Y), train a model to take an object from an image $x \in X$ and paste it onto a new background defined by an image $y \in Y$, while at the same time deleting it from the original background. In other words, the problem is to transform a pair of images $<x=<O,B_x>$ and $y=<\emptyset,B_y>$ into a new pair x and $\hat{y}=<\hat{O},\hat{B}_y>$, where $\hat{B}_x \approx \hat{B}$, $\hat{B}_y \approx \hat{B}$, and $\hat{O} \approx O$, and $\hat{O} \approx O$, but the object and both backgrounds are changed so that the new images look natural.

This general problem can be decomposed into three subtasks:
Segmentation: segment the object O from an original image $x=<O,B_x>$ by predicting the segmentation m=Mask(x); given the mask, we can make a coarse blend that simply cuts off the segmented object from x and pastes it onto y: $z=m \odot x + (1-m) \odot y$, where $\odot$ denotes componentwise multiplication. In the process of learning, the parameters of the neural network are adjusted in such a way that, when the image with the object is input, this neural network gives the correct mask on which the object is selected. The user does not participate in this process.
Enhancement: given the original images x and y, coarse image z, and segmentation mask m, construct a refined version $\hat{y}=<\hat{O}, \hat{B}_y>$. —Inpainting: given a segmentation mask m and an image $(1-m) \odot x$ obtained by zeroing out pixels of x according to m, restore the background-only image $\hat{x}=<\emptyset, \hat{B}_x>$. Instead of removed segmented object O, a part of the image is filled with the third neural network based on the remaining part of the image and a random signal. During training, the parameters of the third neural network are configured in such a way that, on the basis of this fragmentary information, it produces a plausible background fill. The result is two images $\hat{x}$ and $\hat{y}$. However, the focus is on the image $\hat{y}$, while the image with a blank background is an intermediate result of this algorithm, although it can also be used.

For each of these tasks we can construct a separate neural network that accepts an image or a pair of images and outputs new image or images of the same dimensions. However, our main hypothesis that we explore in this work is that in the absence of large paired and labeled datasets (which is the normal state of affairs in most applications), it is highly beneficial to train all these neural networks together.

Thus, we present our SEIGAN (Segment-Enhance-Inpaint) architecture that combines all three components in a novel and previously unexplored way. In the FIG. 1 boxes with dotted outline denote data (images); ellipses denote objects contained in the data; boxes with sharp corners denote subprograms implementing neural networks; boxes with rounded corners denote subprograms which control the process of tuning neural network parameters during the training procedure; lines denote flows of data during training procedure (the fact that an arrow points from one box to another means that the results of the first box are passed as input to the second).We outline the general flow of our architecture on FIG. 1; the "swap network" module there combines segmentation and enhancement. Since cut-and-paste is a partially reversible operation, it is natural to organize the training procedure in a way similar to Cycle-GAN [30]: the swap and inpainting networks are applied twice in order to complete the cycle and be able to use the idempotency property for the loss functions. We denote by $\hat{x}$ and $\hat{y}$ and y the results of the first application, and by $\hat{\hat{x}}$ and $\hat{\hat{y}}$ the results of the second application, moving the object back from $\hat{x}$ and $\hat{y}$ (see FIG. 1).

The architecture, showed in FIG. 1, combines five different neural networks, three used as generators, which create an image and convert it, and two as discriminators, which estimate plausibility of the image:
$G_{seg}$ is solving the segmentation task: given an image x, it predicts Mask(x), the segmentation mask of the object on the image;
$G_{inp}$ is solving the inpainting problem: given m and $(1-m) \odot x$, predict $\hat{x}=<\emptyset,\hat{B}_x>$;
$G_{enh}$ does enhancement: given x, y, and $z=m \Theta x+(1-m)$, predict
$D_{bg}$ is the background discriminator that attempts to distinguish between real and fake (inpainted) background-only images; its output $D_{bg}(x)$ should be close to 1 if x is real and close to 0 if x is fake;
$D_{obj}$ is the object discriminator that does the same for object-on-background images; its output $D_{obj}(x)$ should be close to 1 if x is real and close to 0 if x is fake.

Generators $G_{seg}$ and $G_{enh}$ constitute the so-called "swap network" depicted as a single unit on FIG. 1 and explained in detail on FIG. 2. This figure depicts the architecture of the "swap network" (a box named "Swap network" on FIG. 1) along with a minimal set of other entities needed to describe how the "swap network" is used. Boxes with dotted outline denote data (images); ellipses denote objects contained in the data; boxes with sharp corners denote subprograms implementing neural networks; boxes with rounded corners denote subprograms which control the process of tuning neural network parameters during the training procedure; lines denote flows of data during training procedure (the fact that an arrow points from one box to another means that the results of the first box are passed as input to the second). Segmentation network is a neural network which takes an image and outputs a segmentation mask of the same size. Refinement network takes an image and outputs an improved its version (i.e. with more realistic colors, with artifacts removed, etc.) of the same size.

Compared to [18], the training procedure in SEIGAN has proven to be more stable and able to work in higher resolutions. Furthermore, our architecture allows to address more tasks (inpainting and blending) simultaneously rather than only predicting segmentation masks. As usual in GAN design, the secret sauce of the architecture lies in a good combination of different loss functions. In SEIGAN, we use a combination of adversarial, reconstruction, and regularization losses.

The inpainting network Ginp aims to produce a plausible background $\hat{B}_x$ given a source image $(1-m)\odot x$, which represents the original image x with the object subtracted according to segmentation mask m obtained by applying the segmentation network, $m=G_{seg}(x)$; in practice, we fill the pixels of m⊙x with white. Parameters of inpainting networks are optimized during the end-to-end training according to the following loss functions (shown by rounded rectangles on FIG. 1).

The adversarial background loss aims to improve the plausibility of the resulting image. It is implemented with a dedicated discriminator network Dbg. For Dbg, we use the same architecture as in the original CycleGAN [30] except for the number of layers; our experiments have shown that a deeper discriminator works better in our setup. As the loss function Dbg uses the MSE adversarial loss suggested in Least Squares GAN (LSGAN) [16], as in practice it is by far more stable than other types of GAN loss functions:

$$L_{bg}^{disc}=(1-D_{bg}(y))^2+\tfrac{1}{2}D_{bg}(\hat{x})^2+\tfrac{1}{2}D_{bg}(\hat{y})^2,$$

where $y=\langle\emptyset,B_y\rangle$ is the original background image, $\hat{x}=\langle\emptyset,\hat{B}_x\rangle$ is the background image resulting from x after the first swap, and $\hat{y}=\langle\emptyset,\hat{B}_y\rangle$ is the background image resulting from $\hat{y}$ after the second swap.

The background reconstruction loss aims to preserve information about the original background $B_x$. It is implemented using texture loss [25], the mean absolute difference between Gram matrices of feature maps after the first 5 layers of VGG-16 networks:

$$L_{bg}^{rec}=|G_{ram}(VGG(y))-G_{ram}(VGG(\hat{y}))|,$$

where VGG(y) denotes the matrix of features of a pretrained image classification neural network (e.g. VGG but not limited to), and $G_{ram}(A)_{ij}=\Sigma_k A_{ik}A_{jk}$ is the Gram matrix.

Our choice of loss functions is motivated by the fact that there are plenty of possible plausible reconstructions of the background, so the loss functions must allow for a certain degree of freedom that mean absolute error or mean squared error would not permit but which texture loss does. In our experiments, optimizing MAE or MSE has usually led to the generated image being filled with median or mean pixel values, with no objects or texture. Note that the background reconstruction loss is applied only to y because we do not have the ground truth background for x (see FIG. 1).

Another important remark is that before feeding the image to the inpainting network Ginp, we subtract a part of image according to segmentation mask m, and we do it in a differentiable way, without any thresholding applied to m. Thus, gradients can propagate back through the segmentation mask to the segmentation network Gseg. Joint training of inpainting and segmentation has a regularization effect.

First, the inpainting network Ginp wants the mask to be as accurate as possible: if it is too small then Ginp will have to erase the remaining parts of the objects, which is a much order problem, and if it is too large then Ginp will have more empty area to inpainting. Second, Ginp wants the segmentation mask m to be high-contrast (with values close to 0 and 1) even without thresholding: if much of m is low-contrast (close to 0.5) then Ginp will have to learn to remove the "ghost" of the object (again, much harder than just inpainting on empty space), and it will most probably be much easier for the discriminator Dbg to tell that the resulting picture is fake.

Showed in FIG. 3 is an example of data consumed and produced by the proposed method. The meanings of the images, from left to right, top-down:

1) The leftmost image in the topmost row is a real input image with an object (an example of "Source image 1" on FIG. 1);
2) 2nd image in the topmost row is a real input image without objects (an example of "Source image 2" on FIG. 1);
3) the mask predicted by the segmentation network given image 1;
4) a real input image with an object (another example of "Source image 1" on FIG. 1);
5) a real input image without objects (another example of "Source image 2" on FIG. 1);
6) The leftmost image in the bottom row is the output of inpainting network with object from image 1 removed by mask on image 3 (an example of "Generated image 1" on FIG. 1);
7) output of refinement network with object from image 1 pasted onto background from image 2 (an example of "Generated image 2" on FIG. 1);
8) the mask predicted by the segmentation network given image 4;
9) output of inpainting network with object from image 4 removed by mask on image 8 (another example of "Generated image 1" on FIG. 1);
10) output of refinement network with object from image 4 pasted onto background from image 5 (another example of "Generated image 2" on FIG. 1).

For Ginp, we use a neural network consisting of two residual blocks connected sequentially (see FIG. 4). We also experimented with ShiftNet [27]. FIG. 4. depicts architecture of ResNet neural network used as "inpainting network" and "segmentation network". Ellipses denote data; rectangles—layers of neural networks. The overall architecture is present in the left part of the Figure. The right part of the figure contains a more detailed description of blocks used in the left part. Arrows denote data flow (i.e. output of one block is fed as input to another block). Conv2d denote convolutional layer; BatchNorm2d denote batch normalization layer; ReLU—linear rectification unit; ReflectionPad—padding of pixels with reflection; ConvTranspose2d-deconvolutional layer.

The swap network aims to generate a new image $\hat{y}=\langle\hat{O},\hat{B}_y\rangle$; from two original images, $x=\langle O,B_x\rangle$ with an object O and $y=\langle\emptyset,B_y\rangle$ with a different background $B_y$.

The swap network consists of two major steps: segmentation $G_{seg}$ and enhancement $G_{enh}$ (see FIG. 2).

The segmentation network Gseg produces a soft segmentation mask $m=G_{seg}(x)$ from x. With the mask m, we can extract the object O from its source image x and paste it on By to produce a "coarse" version of the target image $z=m\odot\pm x+(1-m)\odot y$; z is not the end result, though: it lacks anti-aliasing, color or lightning correction, and other improvements. Note that in the ideal case, pasting an object in a natural way might also require a more involved understanding of the target background; e.g., if we want to paste a dog onto a grass field then we should probably put some of the background grass in front of the dog, hiding its paws as they would not be seen behind the grass in reality.

To address this, we introduce the so-called enhancement neural network Genh whose purpose is to generate a "smoother", more natural image
$\hat{y}=<\hat{O}, \hat{B}_y>$ given original images x and y, and segmentation mask m, which lead to the coarse result $z=m\odot_x(1-m)\odot y=<O, B_y>$. We have experimented with the enhancement network implemented in four different ways:

black-box enhancement: $G_{enh}(x,y,m)$ outputs the final improved image;

mask enhancement: $G_{enh}(x,y,m)$ outputs a new segmentation mask m' that better fits object O and new background $B_y$ together;

color enhancement: $G_{enh}(x,y,m)$ outputs per-pixel perchannel multipliers $\gamma \odot z$; the weights $\gamma$ are regularized to be close to 1 with an additional MSE loss;

hybrid enhancement: $G_{enh}(x,y,m)$ outputs both a new mask m' and multipliers $\gamma$ In any case, we denote by $G_{enh}(x,y,m)$ the final improved image after all outputs of Genh have been applied to z accordingly.

We train the swap network end-to-end with the following loss functions (shown by rounded rectangles on FIG. 1).

The object reconstruction loss $L_{obj}^{rec}$ aims to ensure consistency and training stability. It is implemented as the mean absolute difference between the source x=(O, Bx) and $x=G_{enh}(\hat{y}, \hat{x}, G_{seg}(\hat{y}))$:

$$L_{obj}^{rec} = \left| x - \hat{\hat{x}} \right|,$$

where $\hat{y}-G_{enh}(x,y,G_{seg}(x))$ and
where $\hat{y}=G_{enh}(x,y,G_{seg}(x))$ and $x=G_{inp}((1-G_{seg}(x))\odot x$, i.e.
$\hat{\hat{x}}$ is the result of applying the swap network to x and y twice.

The adversarial object loss $L_{obj}^{disc}$ aims to increase the plausibility of $\hat{y}=<\hat{O},\hat{B}_y>$. It is implemented with a dedicated discriminator network Dobj. It also has the side effect of maximizing the area covered by segmentation mask $m=G_{seg}(x)$. We apply this loss to all images with objects: real image x and "fake" images $\hat{y}$ and $\hat{x}$. Again, the discriminator has the same architecture as in CycleGAN [30] except for the number of layers, where we have found that a deeper discriminator works better. We again use the MSK loss inspired by LSGAN [16]:

$$L_{obj}^{disc} = (1-D_{obj}(x))^2 + \tfrac{1}{2}D_{obj}(\hat{y})^2 + \tfrac{1}{2}D_{obj}(\hat{\hat{x}})^2$$

The mask consistency loss aims to make the segmentation network invariant against the background. It is implemented as the mean absolute distance between m=Gseg(x), the mask extracted from x=(O, $B_x$), and m=Gseg(y), the mask extracted from $\hat{y}=<\hat{O}, \hat{B}_y>$:

$$L_{mask} = |G_{seg}(x) - G_{seg}(\hat{y})|$$

The mask is essentially black-white picture of the same size as the picture from which this mask was extracted. White pixels on the mask correspond to the selected areas of the image (pixels in which the object is depicted in this case), black ones—to the background. Mean absolute distance is the modulus of the difference in pixel values, averaged over all pixels. The mask is re-extracted to make sure that the neural network that extracts the mask responds precisely to the shape of the object, and does not respond to the background behind it (in other words, the masks for the same object must always be the same).

Finally, apart from the loss functions defined above we have used the identity loss, an idea put forward in CycleGAN [30]. We introduce two different instances of identity loss:

object enhancement identify loss $L_{obj}^{id}$ brings the result of the enhancement network $G_{enh}$ on real images closer to identify: it is the mean average distance between $G_{enh}(x)$ and x itself:

$$L_{obj}^{id} = |G_{enh(x)} - x|;$$

background identify loss $L_{bg}^{id}$ tries to ensure that our cutting and inpainting architecture does not do anything to an image that does not contain objects: for an image $y=<\emptyset, B_y>$ we find a segmentation mask $G_{seg}(y)$, subtract it from y to get $(1-Gseg(y))\odot y$, apply inpainting $G_{inp}$ and then minimize the mean average distance between the original y and the result:

$$L_{bg}^{id} = |G_{inp}(1-G_{seg}(y)))\odot y) - y|.$$

The overall SEIGAN loss function is a linear combination of all loss functions defined above:

$$L = \lambda_1 L_{bg}^{disc} | \lambda_2 L_{bg}^{rec} | \lambda_3 L_{obj}^{disc} + \lambda_4 L_{obj}^{rec} + \lambda_5 L_{mask} + \lambda_6 L_{obj}^{id} + \lambda_7 L_{bg}^{id}$$

with coefficients chosen empirically.

During experiments, we have noticed several interesting effects. First, original images $x=<O, B_x>$ and $y=<\emptyset, B_y>$ might have different scale and aspect ratios before merging. Rescaling them to the same shape with bilinear interpolation would introduce significant differences in low-level textures that would be very easy to identify as fake for the discriminator, thus preventing GAN from convergence.

The authors of [18] faced the same problem and addressed it by a special procedure they use to create training samples: they took foreground and background patches only from the same image to ensure the same scale and aspect ratios, which reduces diversity and makes fewer images suitable for the training set. In our setup this problem is addressed by a separate enhancement network, so we have fewer limitations when finding appropriate training data.

Another interesting effect is the low contrast in segmentation masks when inpainting is optimized against MAE or MSE reconstruction loss. A low-contrast mask (i.e., m with many values around 0.5 rather than close to 0 or 1) allows information about the object from the original image to "leak through" and facilitate reconstruction. A similar effect has been noticed before by other researchers, and in the CycleGAN architecture it has even been used for steganography [4]. We first addressed this issue by converting the soft segmentation mask to a hard mask by simple thresholding. Later we found that optimizing inpainting against the texture loss $L_{bg}^{rec}$ is a more elegant solution that leads to better results than thresholding.

For the segmentation network Gseg, we used the architecture from CycleGAN [30], which itself is an adaptation of the architecture from [10]. For better performance, we replaced ConvTranspose layers with bilinear upsampling. Also, after the final layer of the network we used the logistic sigmoid as the activation function.

For the enhancement network Genh, we used the U-net architecture [20] since it is able both to work with images in high resolution and to make small changes in the source image. This is important for our setup because we do not want to significantly change the image content in the enhancement network but rather just "smooth" the boundaries of the pasted image in a smarter way.

FIG. 5 This figure depicts architecture of U-Net neural network used as "inpainting network" and "refinement network". Ellipses denote data; rectangles —layers of neural networks. The overall architecture is present in the left part of the Figure. The right part of the figure contains a more detailed description of blocks used in the left part. Arrows denote data flow (i.e. output of one block is fed as input to another block). Conv2d denote convolutional layer; BatchNorm2d denote batch normalization layer; ReLU—linear rectification unit; ReflectionPad—padding of pixels with reflection; ConvTranspose2d—deconvolutional layer.

Data Preparation

Major part of our experiments is carried out on images, publicly available on Flickr under Creative Commons license. We used query "dog" to collect initial image. Then we used a pretrained Faster R-CNN to detect all objects (including dogs) and all regions without any object. Then we constructed two datasets $\{<O, B_1>>\}$ (from regions with dogs) and $\{(B_2)\}$ (from regions without objects of any class). After data collection, we conducted data filtering procedure in order to get regions of images without any extraneous objects.

The filtering procedure was carried out as follows. First of all, we used a Faster R-CNN [19] (pretrained on MS COCO (14)) to detect all objects on an image. Then, we get crops of the input image according to the following rules:
1. After rescaling, size of the object is equal to 64×64 and size of the final crop is equal to 128×128;
2. The object is located at the center of the crop;
3. There are no other objects which intersect with the given crop;
4. The source size of the object on a crop is bigger than 60 (by smallest side) and no bigger than 40 percentage of the whole source image (by longest side).

The foregoing exemplary embodiments are examples and are not to be construed as limiting. In addition, the description of the exemplary embodiments is intended to be illustrative, and not to limit the scope of the claims, and many alternatives, modifications, and variations will be apparent to those skilled in the art.

REFERENCES

[1] J A. Almahairi. S. Rajeswar, A. Sordoni, R Bachman, and A. Courville. Augmented cyclegan: Learning many-to-many mappings from unpaired data. arXiv preprint arXiv.1802.10151. 2018.
[2] K. Bousmalis. A. Iipan. P. Wohlhait. Y. Bai. M. Kelcey. M. Kalakrishnan. L Downs. J. I bar/. P. Pastor. K. Konolige. et al. Using simulation and domain adaptation to improve efficiency of deep robotic grasping. In 2018 IEEE International Conference on Robotics and Automation (ICRA), pages 4243-4250. IEEE, 2018.
[3] Y. Choi. M. Choi. M. Kim. J.-W. Ha. S. Kim. and J. Choo. Stargan: Unified generative adversarial networks for multi-domain image-to-image translation. arXiv preprint. 1711, 2017.
[4] C. Chu. A. Zhmoginov. and M. Sandler. Cyclegan: a master of steganography. arXiv preprint arXiv: 1712.02950,2017.
[5] M. Cordts. M. 6mran. S. Ramos, T. Rehfeld, M. Enzweiler, R. Benenson. U. Franke. S. Roth, and B. Schiele. The cityscapes dataset for semantic urban scene understanding. In Proc. of the IEEE Conference on Computer Vision and Pattern Recognition (CVPR). 2016.
[6] I. Goodfellow, J. Pouget-Abadie. M. Miiza, B. Xu, D. Warde-Farley. S. Ozair. A. Courville. and Y. Bengio. Generative adversarial nets. In Advances in neural information processing systems, pages 2672-2680, 2014.
[7] V. Gupta and S. Raman. Automatic trimap generation for image matting. In Signal and Information Processing (ICon-SIP). International Conference on. pages 1-5. IEEE. 2016.
[8] H. Huang. X. Fang. Y. Ye. S. Zhang, and P. L Rosin Prac-tical automatic background substitution for live video. Computational Visual Media, 3(3):273-284.2017.
[9] X. Ji, J. F. Henriques, and A. Vedaldi. Invariant information distillation for unsupervised image segmentation and clustering. arXiv preprint arXiv:1807.06653, 2018.
[10] J. Johnson, A. Alahi, and F. Li. Perceptual losses for real-time style transfer and super-resolution. CoRR, abs/1603.08155, 2016.
[11] S. Kazemzadeh, V. Ordonez, M. Matten, and T. Berg. Referitgame: Referring to objects in photographs of natural scenes. In Proceedings of the 2014 conference on empirical methods in natural language processing {EMNLP), pages 787-798,2014.
[12] A. Khoreva, R. Benenson, J. H. Hosang, M. Hein, and B. Schiele. Simple does it: Weakly supervised instance and semantic segmentation. In CVPR, volume 1, page 3,2017.
[13] R. Krishna, Y. Zhu, O. Groth, J. Johnson, K. Hata, J. Kravitz, S. Chen, Y. Kalantidis, L.-J. Li, D. A. Shamma, M. Bernstein, and L Fei-Fei. Visual genome: Connecting language and vision using crowdsourced dense image annotations. 2016.
[14] T.-Y. Lin, M. Maire, S. Belongie, J. Hays, P. Perona, D. Ramanan, P. Dollar, and C. L. Zitnick. Microsoft coco: Common objects in context. In European conference on computer vision, pages 740-755. Springer, 2014.
[15] M.-Y. Liu, T. Breuel, and J. Kautz. Unsupervised image-to image translation networks. In Advances in Neural Information Processing Systems, pages 700-708, 2017.
[16] X. Mao, Q. Li, H. Xie, R. Lau, Z. Wang, and S. P. Smolley. Least squares generative adversarial networks, arxiv preprint. arXiv preprint ArXiv:1611.04076, 2(5), 2016.
[17] B. A. Plummer, L. Wang, C. M. Cervantes, J. C Caicedo, J. Hockenmaier, and S. Lazebnik. Flickr30k entities: Collecting region-to-phrase correspondences for richer image-to-sentence models. In Proceedings of the IEEE international conference on computer vision, pages 2641-2649, 2015.
[18] T. Remez, J. Huang, and M. Brown. Learning to segment via
cut-and-paste. arXiv preprint arXiv:1803.06414, 2018.
[19] S. Ren, K. He, R. Girshick, and J. Sun. Faster r-cnn: Towards real-time object detection with region proposal networks. In Advances in neural information processing systems, pages 91-99,2015.
[20] O. Ronneberger, P Fischer, and T. Brox. U-net: Convolutional networks for biomedical image segmentation. CoRR, abs/1505.04597,2015.
[21] C. Rother, V. Kolmogorov, and A. Blake. Grabcut: Interactive foreground extraction using iterated graph cuts. In ACM transactions on graphics (TOG), volume 23, pages 309-314. ACM, 2004.

[22] T.-C. Wang, M.-Y. Liu, J.-Y. Zhu, A. Tao, J. Kautz, and B. Catanzaro. High-resolution image synthesis and semantic manipulation with conditional gans. arXiv preprint arXiv:1711.11585,2017.
[23] Z. Wu, R. Chang, J. Ma, C. Lu, and C.-K. Tang. Annotation-free and one-shot learning for instance segmentation of homogeneous object clusters. arXiv preprint arXiv:1802.00383, 2018.
[24] X. Xia and B. Kulis. W-net: A deep model for fully unsupervised image segmentation. arXiv preprint arXiv: 1711.08506, 2017.
[25] W. Xian, P. Sangkloy, J. Lu, C Fang, F. Yu, and J. Hays. Texturegan: Controlling deep image synthesis with texture patches. CoRR, abs/1706.02823, 2017.
[26] N. Xu, B. L. Price, S. Cohen, and T. S. Huang. Deep image matting. In CVPR, volume 2, page 4, 2017.
[27] Z. Yan, X. Li, M. Li, W. Zuo, and S. Shan. Shift-net: Image inpainting via deep feature rearrangement. arXiv preprint arXiv:1801.09392, 2018.
[28] L. Yu, Z. Lin, X. Shen, J. Yang, X. Lu, M. Bansal, and T. L. Berg. Mattnet: Modular attention network for referring expression comprehension. In Proceedings of the IEEE Conference on Computer Vision and Pattern Recognition (CVPR), 2018.
[29] Y. Zhang, L. Yuan, Y. Guo, Z. He, I.-A. Huang, and H. Lee. Discriminative bimodal networks for visual localization and detection with natural language queries. In Proceedings of the IEEE Conference on Computer Vision and Pattern Recognition (CVPR), 2017.
[30] J. Zhu, T. Park, P. Isola, and A. A. Efros. Unpaired image-to-image translation using cycle-consistent adversarial networks. CoRR, abs/1703.10593, 2017.
[31] J.-Y. Zhu, R. Zhang, D. Pathak, T. Darnell, A. A. Efros, O. Wang, and E. Shechtman. Toward multimodal image-to-image translation. In Advances in Neural Information Processing Systems, pages 465-176, 2017.

The invention claimed is:

1. A computing system for performing automated image processing, the computing system comprising:
a first neural network for forming a coarse image z by segmenting an object O from an original image x containing the object O and background $B_x$ by a segmentation mask, and, using the segmentation mask, cutting off the segmented object O from the image x and pasting it onto an image y containing only background $B_y$;
a second neural network for constructing an enhanced version of an image $\hat{y}$ with pasted segmented object O by enhancing coarse image z based on the original images x and y and the segmentation mask; and
a third neural network for restoring the background-only image $\hat{x}$ by inpainting image obtained by zeroing out pixels of image x using the segmentation mask,
wherein the first, second and third neural networks are combined into common architecture of neural network for sequential performing segmentation, enhancing and inpainting and for simultaneously learning,
wherein the common architecture of neural network accepts the images and outputs processed images of same dimensions,
wherein the computing system further comprising two neural networks configured as discriminators, which estimate plausibility of the images, and
wherein a first discriminator is a background discriminator that attempts to distinguish between a reference real background image and inpainted background image, and a second discriminator is an object discriminator that attempts to distinguish between a reference real object O image and an enhanced object O image.

2. The computing system of claim 1, wherein the first, second and third neural networks are generators which create the images $\hat{x}$ and $\hat{y}$ and convert them.

3. The computing system of claim 1, in which the first and second neural networks constitute a swap network.

4. The computing system of claim 3, in which the swap network is configured to train end-to-end with loss functions for constructing enhanced version of the image $\hat{y}$ with pasted the segmented object O.

5. The computing system of claim 3, in which one of loss functions is an object reconstruction function for ensuring consistency and training stability, and is implemented as a mean absolute difference between the image x and image $\hat{x}$.

6. The computing system of claim 4, in which one of loss functions is an adversarial object function for increasing the plausibility of the image $\hat{y}$, and is implemented with a dedicated discriminator network.

7. The computing system of claim 4, in which one of loss functions is a mask consistency function for making the first network being invariant against the background, and is implemented as a mean absolute distance between a mask extracted from image x and a mask extracted from image $\hat{y}$.

8. The computing system of claim 4, in which one of loss functions is an object enhancement identity function for forcing the second network to produce images closer to real images, and is a mean absolute distance between a result of the second network $G_{enh}(x)$ and the image x.

9. The computing system of claim 4, in which one of loss functions is a background identity function for ensuring that the common architecture does not do anything to an image that does not contain objects.

10. The computing system of claim 4, in which one of loss functions is an overall loss function that is a linear combination of an object reconstruction function, an adversarial object function, a mask consistency function, an object enhancement identity function, and a background identity function.

11. The computing system of claim 1, in which the segmentation mask is predicted by the first network in view of image x.

12. A method for automated image processing, the method comprising:
using a first neural network:
forming a coarse image z by segmenting an object O from an original image x containing the object O and background $B_x$ by a segmentation mask, and
using the segmentation mask, cutting off the segmented object O from the image x and pasting it onto an image y containing only background $B_y$;
using a second neural network:
constructing an enhanced version of an image $\hat{y}$ with pasted segmented object O by enhancing coarse image z based on the original images x and y and the segmentation mask;
using a third neural network:
restoring the background-only image $\hat{x}$ by inpainting image obtained by zeroing out pixels of image x using the segmentation mask;
outputting the images $\hat{x}$ and $\hat{y}$ of same dimensions; and
using two neural networks which are configured as discriminators:
estimating plausibility of the images,
wherein the first, second and third neural networks are combined into common architecture of neural network for sequential performing segmentation, enhancing and inpainting and for simultaneously learning, wherein the common architecture of neural network accepts the images and outputs processed images of same dimensions, and wherein a first discriminator is a background discriminator that attempts to distinguish between a reference real background image and inpainted background image, and a second discriminator is an object discriminator that attempts to distinguish between a reference real object O image and an enhanced object O image.

13. The method of claim 12, in which the first, second and third neural networks are generators which create the images $\hat{x}$ and $\hat{y}$ and convert them.

* * * * *